Jan. 2, 1923.

R. W. MOORE.
VEHICLE WHEEL.
FILED MAY 5, 1919.

1,440,928.

2 SHEETS—SHEET 1.

Witness
Geo. E. Spicker.

Inventor
RAY W. MOORE.

By Fisher …
Attorneys

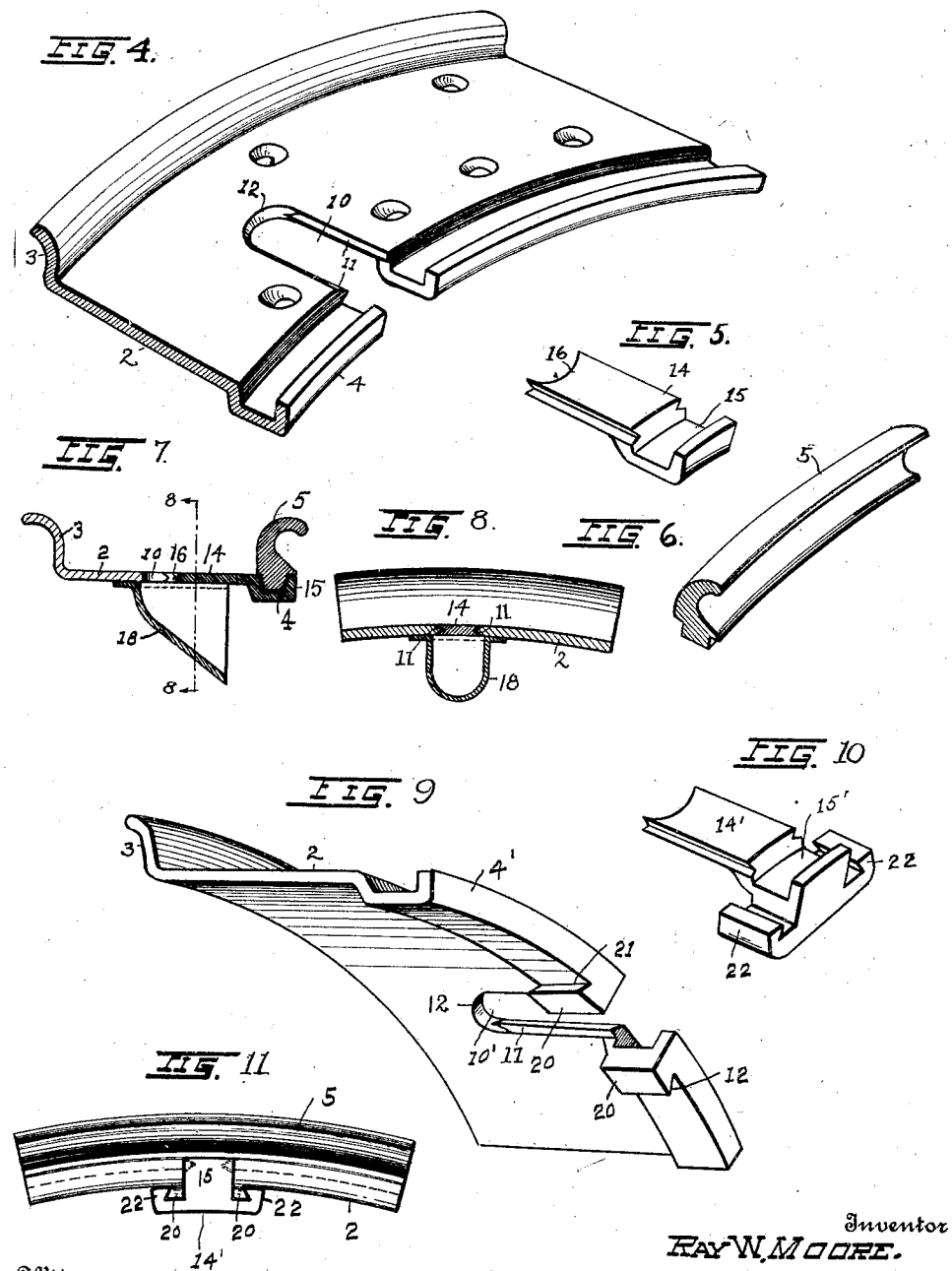

Patented Jan. 2, 1923.

1,440,928

UNITED STATES PATENT OFFICE.

RAY W. MOORE, OF ADENA, OHIO, ASSIGNOR OF ONE-FOURTH TO JAMES J. ROBY, OF CLEVELAND, OHIO.

VEHICLE WHEEL.

Application filed May 5, 1919. Serial No. 294,862.

*To all whom it may concern:*

Be it known that RAY W. MOORE, a citizen of the United States, residing at Adena, in the county of Jefferson and State of Ohio, has invented certain new and useful Improvements in Vehicle Wheels, of which the following is a specification.

This invention relates to an improvement in vehicle wheels, and the general object of the invention is to provide a wheel rim which will firmly seat a pneumatic tire, and permit the tire to be removed from and replaced upon the rim quickly and conveniently and also without injury to the tire or its inflating nipple or valve tube.

A more specific object is to provide a tire seating rim in which a circumferential channel is provided for holding a split locking ring, and in which the rim is slotted transversely at its channeled side to receive the valved inflating tube for the pneumatic tire. This slot is closed by a slidable member which is locked securely upon the rim by the locking ring, and the parts are preferably made to interlock and to be re-inforced and strengthened in a particular way where the rim is slotted.

Figure 1:
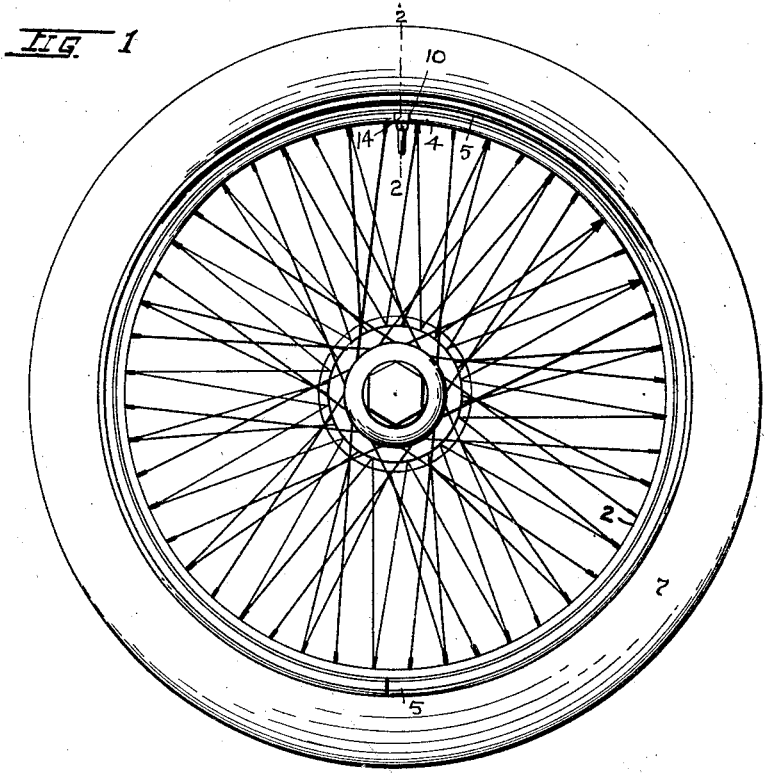
Figure 2:
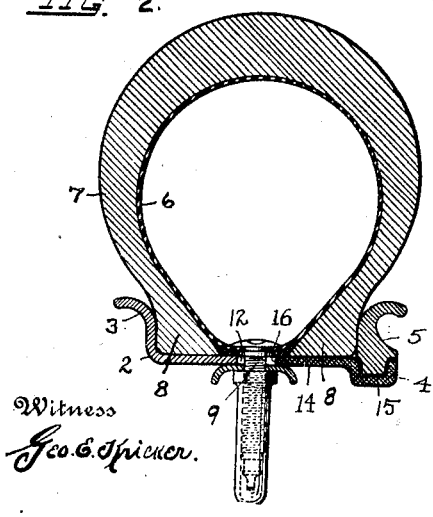
Figure 3:
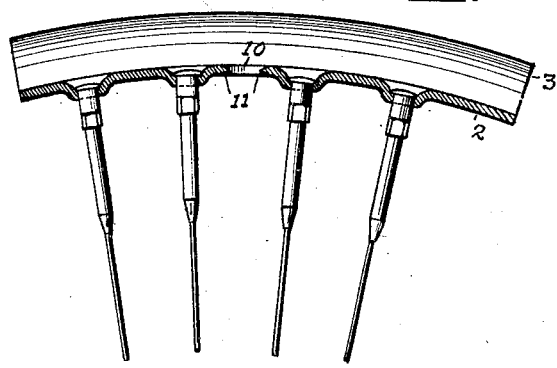

In the accompanying drawings, Fig. 1 is a side view of a vehicle wheel embodying my improvement and showing an inflatable pneumatic tire held in place upon the rim by a split locking ring, Fig. 2 is an enlarged cross section of the wheel rim and pneumatic tire, on lines 2—2, Fig. 1. Fig. 3 is a longitudinal view of a segmental portion of the wheel rim showing the transverse slot for the tire valve tube. Fig. 4 is a perspective view of a segmental portion of a wheel rim, also showing the transverse slot for the tire valve tube. Fig. 5 is a perspective view of the slide or locking member which is adapted to close the slot in the rim. Fig. 6 is a perspective view of a portion of the locking ring which occupies the circumferential channel in the wheel rim. Fig. 7 is a cross section of the wheel rim, locking ring and the locking slide assembled, and showing a connecting bridge piece for the rim where divided by the slot, and Fig. 8 is a vertical section on line 8—8, Fig. 7. Figs. 9, 10 and 11 illustrate a modification of the invention; thus Fig. 9 is a perspective view of a segmental portion of a wheel rim looking at the inner side thereof and showing beveled locking lugs at each side of the transverse slot in the rim. Fig. 10 is a perspective view of the slide member which is used to close the slot and interlock with the lugs shown in Fig. 9. Fig. 11 is a side view of the ring and locking slide shown in Figs. 9 and 10 but with the parts assembled and interlocked.

In some types of automobile wheels in use the rim is a fixed part of the wheel and the pneumatic tire is removably mounted upon the rim, and in other types the rim itself is a removable part of the wheel. In the latter type it is not a difficult operation to remove the rim and tire together from the wheel, but it is more difficult to remove the pneumatic tire from the rim regardless of whether the rim is a fixed or removable part of a wheel for the reason that the pneumatic tire fits snugly and tightly upon the rim, and will not stretch to any great degree or sufficiently to permit the pneumatic tire valve tube to be removed through the usual opening in the rim. That is to say, the pneumatic tire cannot be completely removed from the rim until the tire has been first freed from the rim at a point diametrically opposite the place where the valve tube is located, and this means that the pneumatic tire must be distorted, bent and stretched, especially if it fits snugly upon the rim as it should.

My idea is to slot the rim at one side for the valve tube so that the pneumatic tire may be slipped off freely at all points in the same degree without bending, distorting, or stretching the tire in any way, and my conception also involves the use of such safeguards as are necessary to provide a strong reliable wheel regardless of the slot in the rim.

In Figs. 1 to 6 inclusive, I show a wire wheel having a metal rim 2 which is provided at one side with a curved flange and at its other side with a channeled edge 4 adapted to receive a split locking ring 5 corresponding partly in shape to flange 3. The pneumatic tire which is mounted upon rim 2 comprises a rubber inner tube 6 and an outer casing 7 of fabric and rubber having base portions 8 fashioned according to the shape of the rim, and the general practice is to make the base of the pneumatic tire flat and of substantially the same diameter as the seating surface of the rim so as to conform thereto and fit snugly thereon. Of course, provision must be made for receiving the valve tube 9 of the inner tube 6 and in my invention the rim 2 is provided with a transverse slot 10 which terminates about midway of the sides of the rim and extends through the channeled side 4 of the rim. The opposite straight edges 11 of the slot are reversely beveled beginning at the inner side of the circumferential channel in the rim and extending inwardly to a point where the end 12 of the slot is rounded or of semi-circular form. When a pneumatic tire is in place upon the rim the valve tube 9 extends through the inner end of the slot where rounded, and the tire may be easily and quickly removed, providing the divided or split locking ring 5 has been removed from the circumferential channel in the rim.

To strengthen the rim and also prevent the entrance of dirt and other matter underneath the pneumatic tire, I close the slot 10 by means of a slide member 14 which has the upper face of its outer end 15 channeled and shaped to correspond to the channeled edge 4 of the rim, and the opposite side edges of this member 14 are grooved to slidably engage the beveled edges 11 of the slot. The inner end 16 of member 14 is concave or semi-circular to conform to the circular shape of the valve tube, but the valve tube is of relatively less diameter than the round opening thus formed at the inner end of the slot so that a certain amount of freedom of movement will be provided for the valved tube when the pneumatic tire is in place upon the rim. Slide member 14 is locked positively against inward or outward movement by the locking ring 5, and which locking ring it will be noted, spans the slot and is seated in the channeled end 15 of said member 14. This channeled end 15 projects beneath the bottom or inner face of the rim and affords a shoulder adapted to be gripped by a pair of pliers or other suitable instrument or this projecting part may be hammered from the inner side of the wheel if the slide member 14 should bind or stick.

In Figs. 7 and 8 I show a supplemental metal bridge piece 18 which is of U-shape in cross section and welded to the rim at each side and at one end of the slot 10. This piece serves as a reinforcement for the rim and also as a protecting housing for the valve tube. The bottom of piece 18 is also preferably inclined relatively to the base of the rim so that the tire tube will be bent and projected outwardly toward the outer side of the wheel rim.

In Figs. 9, 10 and 11 I show the identical form of slotted rim, with a locking ring and locking slide as hereinbefore described and shown in Figs. 1 to 6 inclusive, but with additional interlocking elements forming a part thereof. Thus the channeled portion 4' of the rim is provided with additional lugs 20 at each side of slot 10' and which lugs have beveled faces 21 extending transversely of the rim approximately the full width of the channeled portion 4'. The slide member 14' shown in Fig. 10 is equipped with a dove-tailed wing 22 at each end of its channeled portion 15', whereby interlocking engagement may be had with the beveled lugs 20 on the rim and the parts prevented from spreading or becoming misaligned. Their interlocking relation is plainly shown in Fig. 11.

With my invention, the tire may be removed from the rim very easily without hammering, distorting, or stretching it in any way, thereby avoiding injury to the fabric and prolonging the life of the tire.

What I claim is:

1. A vehicle wheel having a seating rim for a pneumatic tire, said rim being provided with a transverse slot to receive the valved inflating tube of the pneumatic tire, a closure member for the slot having a channeled end, and a locking ring removably engaged with the rim and adapted to hold the pneumatic tire in place upon the rim and to span and be seated in locking engagement within the channeled end of said closure member.

2. A vehicle wheel having a flanged rim and a circumferential channel in the rim and a slot transversely of the rim where channeled, a closure member for the slot slidably engaged with the side edges of the slot and provided at one end with a channel adapted to form a co-extension of the circumferential channel of the rim, and a split locking ring removably seated in the channel of said rim and locking member.

3. A vehicle wheel having a tire seating rim with a transverse slot therein adapted to receive the valve tube of a pneumatic tire mounted upon the rim, a closure member for said slot removably engaged with the rim and having a dove-tailed interlocking connection with the rim at each side of said slot.

4. A vehicle wheel having a rim adapted to seat a pneumatic tire having a valve tube said rim having a transverse slot adapted to receive said valve tube, beveled lugs on said rim at each side of said slot, and a closure member for said slot in slidable engagement with said rim having dove tailed wings adapted to interlock with said lugs.

5. A vehicle wheel having a rim adapted to seat a pneumatic tire, said rim having a transverse slot extending through one side thereof adapted to receive the valve tube of the tire, and a separate U-shaped reinforcing and bridging piece united to said rim at each side of said slot.

6. A rim for a vehicle wheel, having a flange at one side and a circumferential channel at its opposite side and a transverse slot extending through its channeled side, in combination with a divided ring removably seated in said circumferential channel in spanning relation to said slot.

7. The combination of a wheel rim, provided with an aperture adapted to receive a tire-inflating valve and a slot extending laterally from said aperture and adapted to admit a valve to said aperture, means adapted to normally close said slot, said rim being also provided with a groove, and said means having a groove forming a continuation of the groove of said rim, and means normally positioned in said grooves and adapted to retain a tire upon said rim.

Signed at Adena, in the county of Jefferson and State of Ohio, this 18th day of April, 1919.

RAY W. MOORE.